(12) United States Patent
Collins et al.

(10) Patent No.: US 8,138,911 B2
(45) Date of Patent: Mar. 20, 2012

(54) PERSONAL LOCATOR BEACON

(75) Inventors: Charles K. Collins, Alexandria, VA (US); Joseph Landa, Alexandria, VA (US)

(73) Assignee: BriarTek IP, Alexandria, VA (US)

( * ) Notice: Subject to any disclaimer, the term of this patent is extended or adjusted under 35 U.S.C. 154(b) by 1455 days.

(21) Appl. No.: 11/627,535

(22) Filed: Jan. 26, 2007

(65) Prior Publication Data

US 2007/0264967 A1  Nov. 15, 2007

Related U.S. Application Data

(60) Provisional application No. 60/788,462, filed on Mar. 30, 2006.

(51) Int. Cl.
*G08B 1/08* (2006.01)
*H04M 11/04* (2006.01)
*G01S 1/00* (2006.01)

(52) U.S. Cl. ........... 340/539.1; 340/539.11; 340/539.13; 340/539.21; 455/404.2; 455/115.3; 342/385; 342/386; 342/419

(58) Field of Classification Search ............... 340/539.1, 340/539.13; 342/419
See application file for complete search history.

(56) References Cited

U.S. PATENT DOCUMENTS

| | | | | |
|---|---|---|---|---|
| 5,838,237 | A * | 11/1998 | Revell et al. | 340/573.1 |
| 6,907,238 | B2 * | 6/2005 | Leung | 455/404.1 |
| 7,091,851 | B2 * | 8/2006 | Mason et al. | 340/539.13 |
| 7,151,446 | B2 * | 12/2006 | Culpepper et al. | 340/539.21 |

* cited by examiner

*Primary Examiner* — Donnie Crosland
(74) *Attorney, Agent, or Firm* — IP Strategies

(57) ABSTRACT

A tracking and locating system includes a user unit, a central unit, and a range finder. The user unit includes a beacon that transmits an information signal. The central unit receives the information signal from the beacon, interprets content of the information signal, and reports the content. The range finder receives the information signal from the beacon, interprets a header of the information signal to determine a range, and reports the range.

37 Claims, 8 Drawing Sheets

PERSONAL LOCATOR BEACON

CROSS-REFERENCE TO RELATED APPLICATION

This is related to, and claims the benefit under 35 USC §119(e) of U.S. Provisional Application for Patent No. 60/788,462, which was filed on Mar. 30, 2006.

FIELD OF THE INVENTION

The invention is related to systems for monitoring and locating people in need of rescue in urban-type environments, such as office buildings, or in other enclosed spaces, such as underground mines.

BACKGROUND OF THE INVENTION

Monitoring and locating systems are particularly of use for first responders who routinely enter buildings and other hazardous environments and might need to be located and rescued, or for people who routinely work in enclosed, isolated spaces such as underground mines. Traditional wireless communications and locating systems have not been effective in finding first responders in need of assistance due to the absorption and reflection of radio waves inside most structures. For example, radios have been used in buildings to find firefighters but frequencies that do a good job in sending voice signals at an appropriate range use shorter wavelengths and tend to bounce off of walls and other hard items. Lower frequencies that propagate through walls in straight lines do not propagate far enough or have enough bandwidth to send the needed information. It would be advantageous, therefore, to provide a system that monitors people within an urban landscape or enclosed building, and provides quick, reliable means for determining an emergency situation and locating those at risk.

SUMMARY OF THE INVENTION

The invention is a system that includes a monitoring and locating beacon suitable for use by people inside buildings and in other enclosed spaces.

According to an aspect of the invention, a tracking and locating system includes a user unit, a central unit, and a range finder. The user unit includes a beacon that transmits an information signal. The central unit receives the information signal from the beacon, interprets content of the information signal, and reports the content. The range finder receives the information signal from the beacon, interprets a range field of the information signal to determine a range, and reports the range. The range field can be, for example, an header.

The beacon can constantly transmit the information signal. Alternatively, the beacon can periodically transmit the information signal, or can transmit the information signal in response to one or more predetermined events.

The user unit can be adapted to be worn by or otherwise attached to an individual user.

The central unit can include a transmitter that transmits an actuation signal, and the user unit can include a receiver that receives the actuation signal from the central unit, whereby the user unit is actuated in response to receiving the actuation signal.

The content of the information signal can include information related to the status of the user. For example, the information related to the status of the user can include current status information and historic status information. The beacon can transmit the information signal at any time, including when the status information changes.

The user unit can include a motion detector, in which case the content of the information signal can indicate a lack of motion of the user when the motion detector detects no motion for a predetermined time period. The central unit can report the lack of motion of the user when the motion detector detects no motion for the predetermined time period. The user unit can also include an accelerometer, in which case the content of the information signal can indicate a fall by the user when the accelerometer detects acceleration of the user unit above a predetermined threshold. The central unit can report the fall by the user when the accelerometer detects acceleration of the user unit above the predetermined threshold.

The user unit can include a temperature sensor, in which case the content of the information signal can include an indication of ambient temperature sensed by the temperature sensor. The central unit can report the ambient temperature sensed by the temperature sensor when the ambient temperature sensed by the temperature sensor is above a predetermined threshold.

The user unit can include an environmental sensor, in which case the content of the information signal includes an indication of environmental hazard status sensed by the environmental sensor. For example, the environmental sensor can sense the ambient presence of combustible gas proximate to the environmental sensor. In this case, the central unit can report the ambient presence of combustible gas sensed by the environmental sensor when the ambient presence of combustible gas sensed by the environmental sensor is above a predetermined threshold. As another example, the environmental sensor can sense the ambient presence of oxygen proximate to the environmental sensor. In this case, the central unit can report the ambient presence of oxygen sensed by the environmental sensor when the presence of oxygen sensed by the environmental sensor is below a predetermined threshold.

The information signal can include a field identifying the user. An identification indicator corresponding to this field can be reported by the central unit.

The user unit can transmit a homing signal. For example, the user unit can constantly transmit the homing signal, or periodically transmit the homing signal. The user unit can transmit the information signal at a first frequency and the homing signal at a second frequency. For example, the first and second frequencies can be different RF frequencies, and preferably the first frequency is higher than the second frequency.

The system can include at least two user units in communication with each other and with the central unit over a mesh network. The central unit can track relative locations of the user units over the mesh network.

The homing signal can be transmitted at least two different signal strengths. The homing signal can include a signal strength field that identifies the signal strength. For example, the signal strength field can be a header. The range finder can read the homing signal strength field and report a range associated with the signal strength.

The central unit can include a visual monitor on which the central unit displays the content of the information signal. Alternatively, or in addition, the central unit can include an audio alarm that sounds when the information signal indicates an alarm condition.

DETAILED DESCRIPTION OF THE INVENTION

Figure 1:
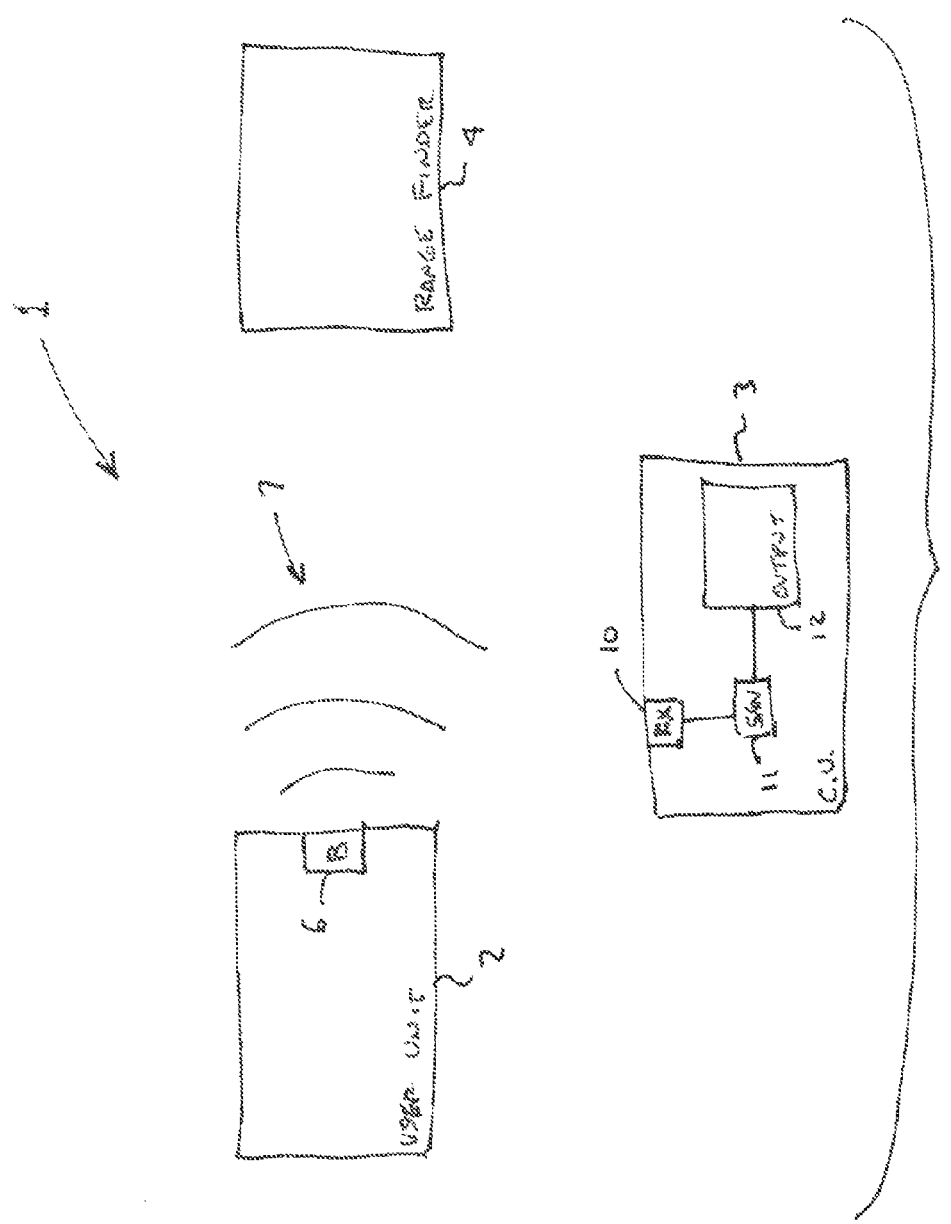
FIG. 1 is a block diagram of an exemplary embodiment of the tracking and locating system of the invention.
Figure 3:
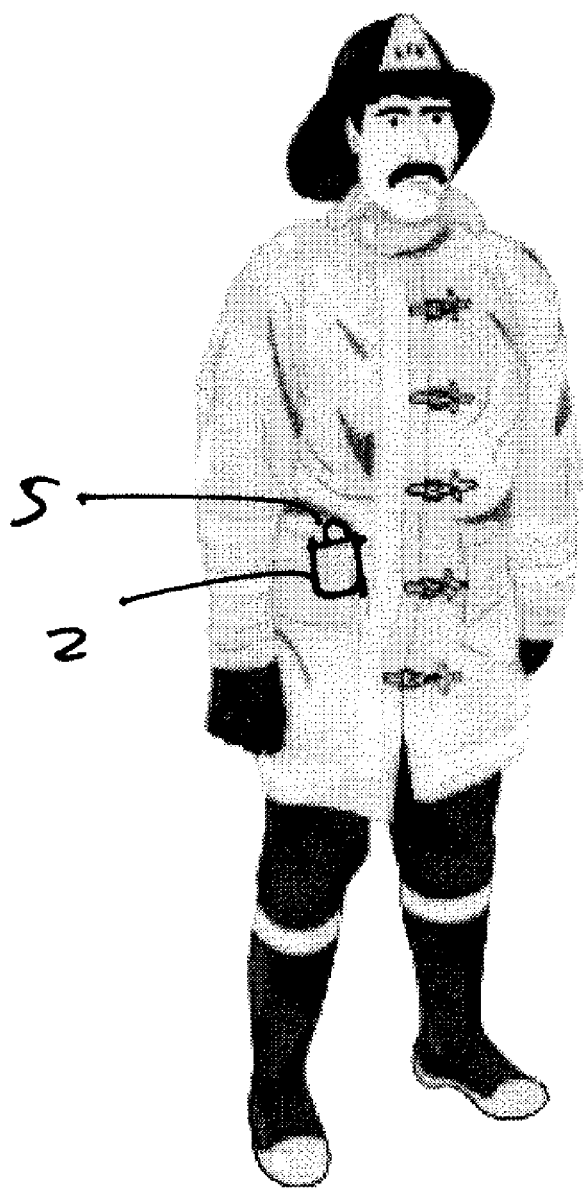
FIG. 3 shows an exemplary user unit worn by an individual.

FIG. 1 shows an exemplary embodiment of the tracking and locating system 1 of the invention. As shown, the system 1 includes a user unit 2, a central unit 3, and a range finder 4. As used in the field, there likely will be a number of user units, preferably one for each user, in communication with the central unit 3 and the range finder 4. As shown in FIG. 3, the user unit 2 can be adapted to be worn by an individual user, through the use of a strap, a clip, a hook-and-loop fastener, or any other known removable fastening implement 5. The fastening implement 5 can be used to attach the user unit 2 to the user, such as by providing an armband to hold the user unit 2, or to attach the user unit 2 to the user's clothing or other equipment, such as by providing an belt clip or pocket clip for holding the user unit 2, as shown in FIG. 3.

Figure 2:
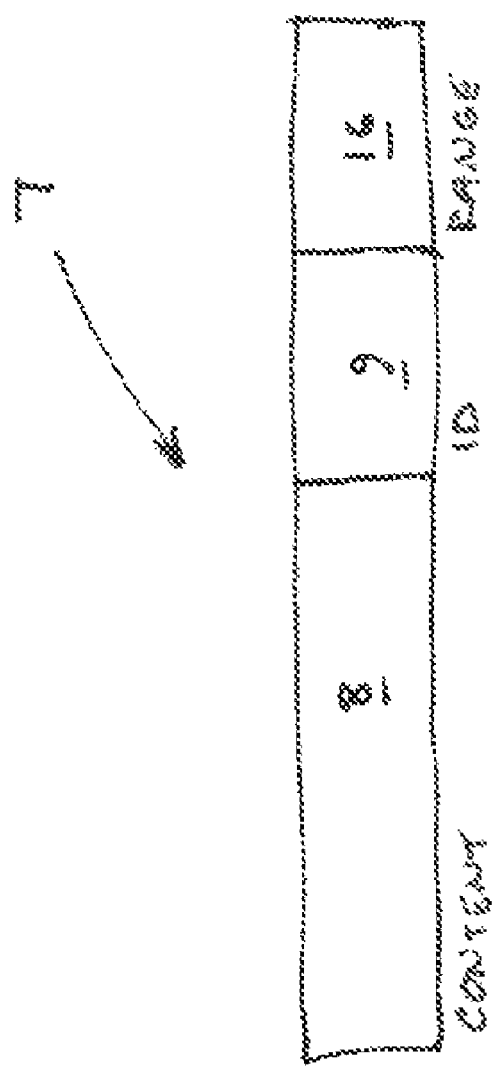
FIG. 2 shows the content of an exemplary information signal.

Each user unit 2 includes a beacon 6 that transmits an information signal 7, preferably using an omnidirectional transmission subsystem. The beacon 6 can constantly transmit the information signal 7. Alternatively, the beacon 6 can periodically transmit the information signal 7, or transmit the information signal 7 according to any preferred time sequence or in response to one or more predetermined events. Preferably, the beacon 6 includes a transmitter and associated hardware for transmitting an omnidirectional signal, although a directed signal could be preferred in some applications. As shown in FIG. 2, the content 8 of the information signal 7 can include information related to the status of the user, which can include current status information and historic status information. A change in the status information can be used to trigger transmission of the information signal 7 by the beacon 6. The information signal can also include an ID field 9 identifying the user by number or some other identifier, which is particularly useful when a number of users are tracked by the system 1 in a single application. An identification indicator corresponding to this ID field 9 can be reported by the central unit 3.

The central unit 3 receives the information signal 7 from the beacon 6, interprets the content 8 and ID 9 (if present) of the information signal 7, and reports the content 8 and ID 9. Thus, the central unit 3 preferably includes a receiver 10, some sort of processing capability, such as a microprocessor and supporting circuitry and software 11, and an output device 12. The output device 12 can be an audio device, such as an audio speaker, a visual output device, such as a video monitor, or a transmitter for passing the information signal to another receiver, such as a remote report unit or logging device, or any combination of these. Depending on the type of output device or devices utilized by a particular central unit 3, the central unit 3 can report the content 8 of the information signal 7 by, for example, providing an audible alarm tone and a visual indication of the content 8 of the information signal 7. The visual indication can be, for example, an alphanumeric code that represents a user status, or an actual textual description of the condition. If the central unit 3 includes a transmitter for passing the information signal 7, the information signal 7 can first be formatted for compatibility with the requirements on the receiving end, and the central unit 3 can include the circuitry and/or software necessary to perform the formatting and transmission. Preferably, in use, the central unit 3 will be located outside of the confined space in which the user units 2 are located.

Figure 4:
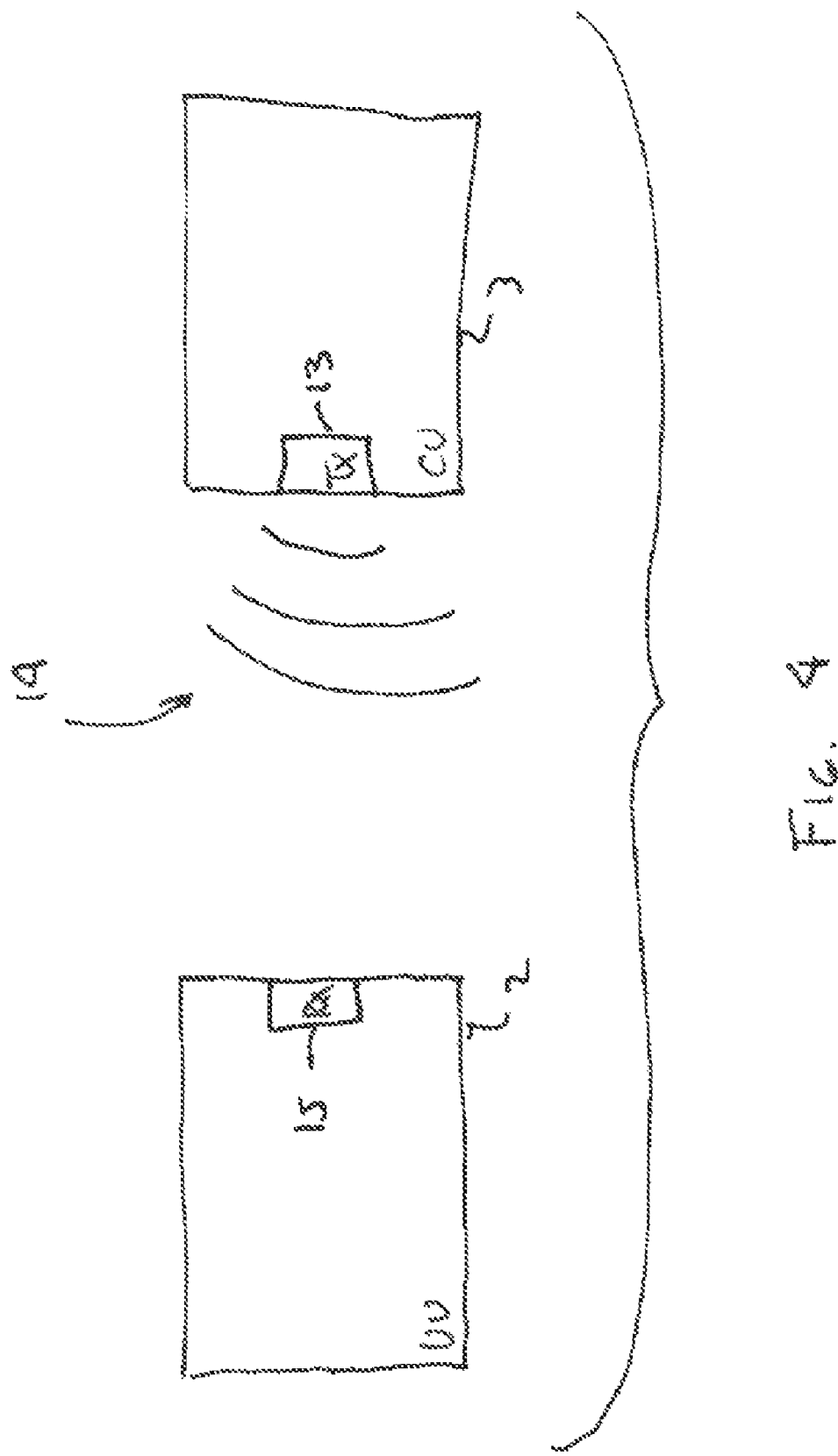
FIG. 4 is a block diagram showing actuation of a user unit by a central unit.

The central unit 3 can also be used to actuate the user units 2 in the field, according to any means that is known in the art, to eliminate the need for individual users to remember to actuate the units under emergency conditions. For example, as shown in FIG. 4, the central unit 3 can include a transmitter 13 that transmits an actuation signal 14. The user unit 2 in turn can include a receiver 15 that receives the actuation signal 14 from the central unit 3, whereby the user unit 2 is actuated in response to receiving the actuation signal 14. Actuation of the user unit 2 preferably includes actuation of all sensors and components of the user unit 2. On actuation, the user unit 2 can transmit an initial information signal 7 to log in with the central unit 3, so that monitoring personnel know that the user unit 2 for that user is functioning. The information displayed on the output device 12 of the central unit can include a list of all user unit IDs, which is preferably refreshed on receipt of an information signal 7 from any user unit 2. The absence of a refreshed ID is an indication that a problem might exist with that user unit 2 or user, and appropriate steps can be taken.

Figure 5:
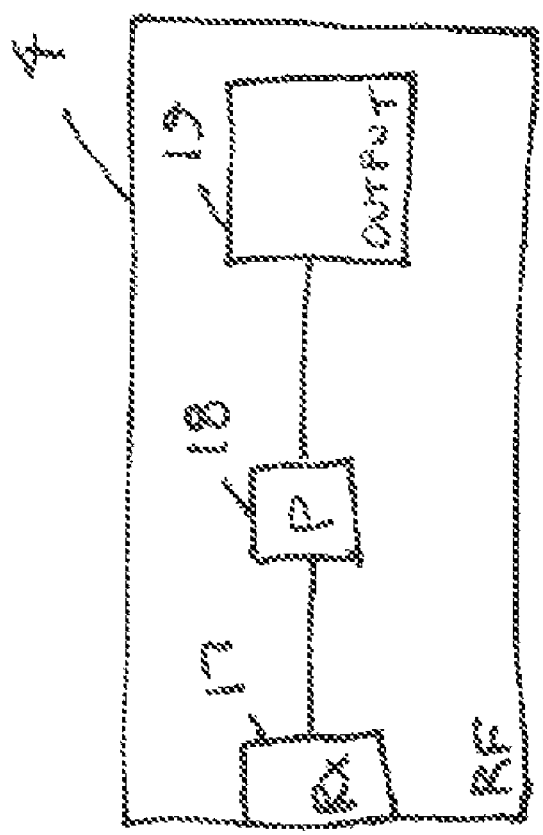
FIG. 5 is a block diagram showing details of an exemplary range finder.

The range finder 4 receives the information signal 7 from the beacon 6, interprets a header or other range field 16 of the information signal 7 to determine a range, and reports the range. As shown in FIG. 5, the range finder 4 includes a receiver 17, the processing capability 18 necessary at least to distinguish and read the range field 16, and an output device 19. The output device 19 can be an audio device, such as an audio speaker, a visual output device, such as a video monitor, or a transmitter for passing the information signal 7 or range field 16 to another receiver, such as a remote report unit or logging device, or any combination of these. Depending on the type of output device or devices utilized by a particular range finder 4, the range finder 4 can report the range by, for example, providing an audible alarm tone and a visual indication of the range. The visual indication can be, for example, an alphanumeric code that represents the range, or an actual textual indication of the range. If the range finder 4 includes a transmitter for passing the information signal 7, the information signal 7 can first be formatted for compatibility with the requirements on the receiving end, and the range finder 4 can include the circuitry and/or software necessary to perform the formatting and transmission. The range finder 4 can be a stand-alone unit, or it can be integrated with the central unit 3 or an auxiliary device. Preferably, in use, the range finder 4 will be located outside of the confined space in which the user units 2 are located.

Figure 6:
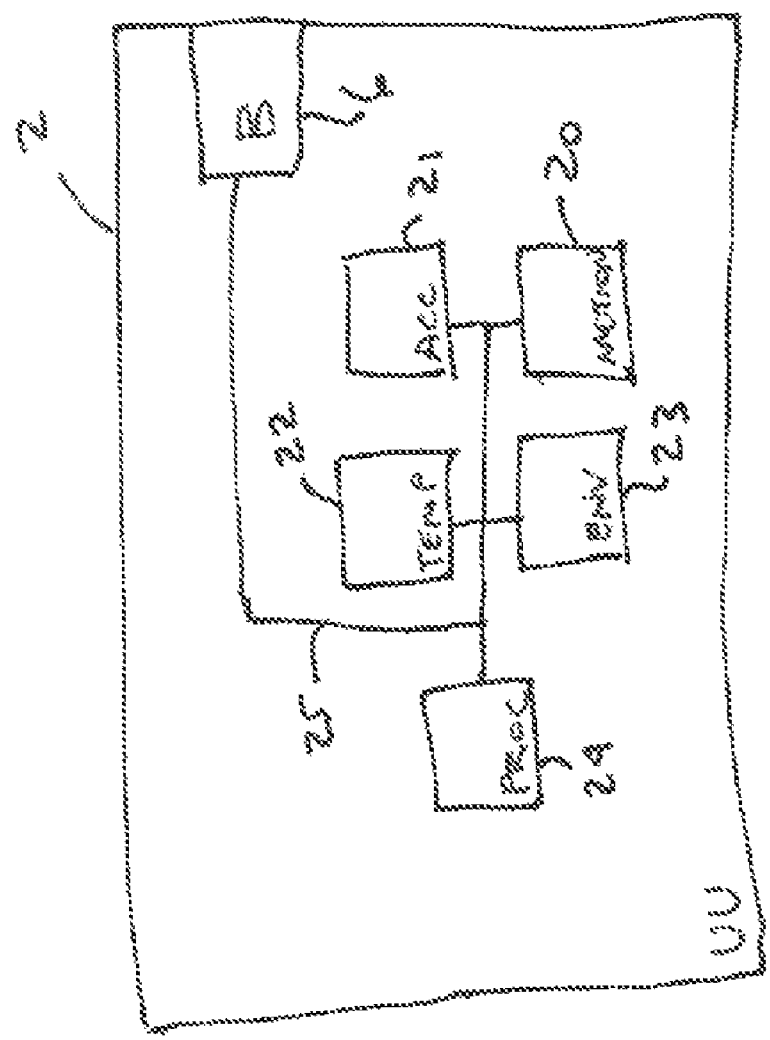
FIG. 6 is a block diagram showing details of an exemplary user unit.

In some applications, it is important to report a lack of motion of the user to the central unit 3. Such a lack of motion can be an indication that the user has been immobilized due to some hazard, or even that the user might have lost consciousness. As shown in FIG. 6, the user unit 2 can include a conventional motion detector 20, which provides a signal indicating motion of the user unit 2 and therefore of the user. If this signal is absent or otherwise indicates a substantial lack of motion of the user for a predetermined time period, the content 8 of the information signal 7 can indicate this lack of motion. The central unit 3 can then report the lack of motion when the received information signal 7 includes this content 8. Certain embodiments of the system can also report the output of the motion detector 20 regardless of the state of the motion detector 20, for example in cases in which this information is relevant to the application.

The user unit 2 can also include an accelerometer 21, in which case the content 8 of the information signal 7 can indicate a fall by the user when the accelerometer 21 detects acceleration of the user unit 2 above a predetermined threshold. The central unit 3 can report a fall by the user when the received information signal 7 includes this content 8. Certain embodiments of the system can also report the output of the accelerometer 21 regardless of the state of the accelerometer 21, for example in cases in which this information is relevant to the application.

In order to monitor the user in under high-temperature conditions, such as when a firefighter is at work in a burning building, the user unit 2 can include a temperature sensor 22, and the content 8 of the information signal 7 can include an indication of ambient temperature sensed by the temperature sensor 22. The central unit 3 can report the ambient temperature sensed by the temperature sensor 22 when the ambient temperature sensed by the temperature sensor 22 is above a predetermined threshold, or it can provide a continuous report of the sensed temperature and issue an alarm if the sensed temperature is over the threshold.

Under certain conditions, it is desirable to monitor other aspects of the user's immediate environment, such as the presence of combustible gas or lack of oxygen. The user unit 2 can include an environmental sensor 23 that detects these or other environmental conditions, and provides an indication of the sensed environmental hazard status in the content 8 of the information signal 7. For example, the environmental sensor 23 can sense the ambient presence of combustible gas or oxygen proximate to the environmental sensor 23. If the presence of combustible gas sensed by the environmental sensor 23 is above a predetermined threshold, or the presence of oxygen sensed by the environmental sensor 23 is below a predetermined threshold, that information can be included in the content 8 of the information signal 7, and the central unit 3 in turn can report the sensed condition, or it can provide a continuous report of the sensed oxygen or other condition and issue an alarm if the sensed oxygen is below the threshold.

The user unit 2 can include any, all, or any combination of the motion detector 20, accelerometer 21, temperature sensor 22, and environmental sensor 23, or of any other type of status-providing component. In order to process the output of any of these components and format the output(s) into the content 8 of the information signal 7, the user unit 2 preferably includes processing capability 24 connected to the components by, for example, a bus 25. The processing capability 24, such as a microprocessor and associated circuitry and software or firmware, forms the information signal 7, including the content 8, the ID field 9, and the range field 16, in a format that can be recognized and read by the central unit 3 and the range finder 4. For use in secure environments, the processing capability 24 can also include software for encrypting the information signal 7, or for providing an authentication function. In this case, the central unit 3 processing capability 11 can provide the corresponding cryptographic or authentication function, as can the processing capability 18 of the range finder 4, as necessary.

Figure 8:
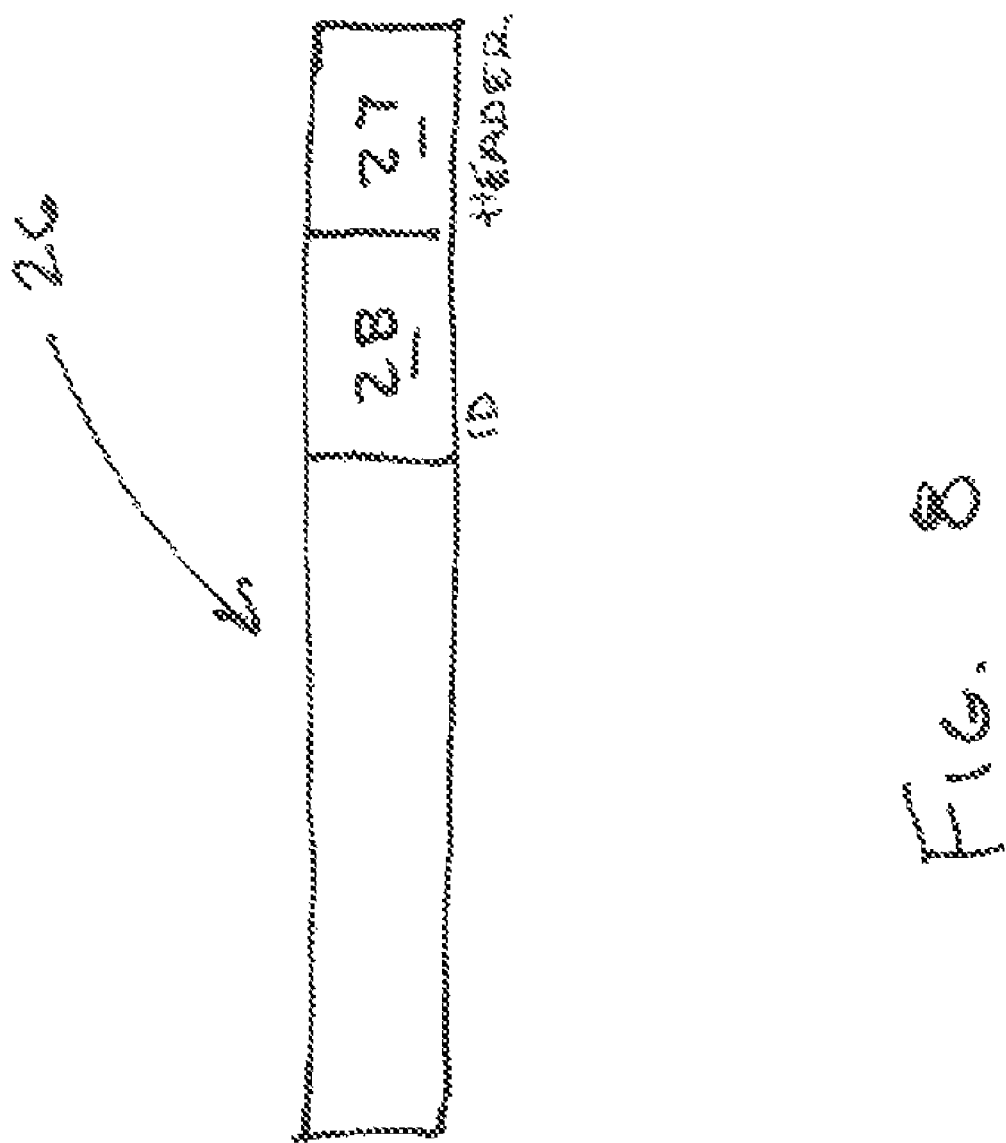
FIG. 8 shows the content of an exemplary homing signal.

The user unit 2 can also transmit a homing signal, constantly, periodically, according to any desired time pattern, or in response to any event, for reception by the range finder 4. Preferably, the user unit 2 transmits the homing signal at a different frequency than the frequency at which it transmits the information signal 7. For example, the two frequencies can be different RF frequencies, and preferably the information signal frequency is higher than the homing signal frequency. The homing signal can be transmitted at least two different signal strengths. As shown in FIG. 8, the homing signal 26 can include a header or other signal strength field 27 that identifies the signal strength at which the homing signal 26 was transmitted. On receiving the homing signal 26, the range finder 4 can read the homing signal strength field 27 and report a range associated with the signal strength. If more than one user is using the system, the homing signal will also include a user ID field 28, and might include other information.

For example, the user unit 2 can transmit the homing signal 26 at three different strengths S1, S2, and S3. S1 is the lowest signal strength in this example, and is associated with a closest range R1, which is reported in the homing signal strength field 27. A range finder 4 receiving the homing signal 27 transmitted at S1 would report that the user identified by the homing signal is in the range R1. Likewise, S2 is the intermediate signal strength in this example, and is associated with an intermediate range R2, which extends beyond R1 and is reported in the homing signal strength field 27. A range finder 4 receiving the homing signal 27 transmitted at S2 but not a homing signal 26 transmitted at S1 would report that the user identified by the homing signal is in the range R2. In the same manner, S3 is the highest signal strength in this example, and is associated with a farthest range R3, which extends beyond R2 and is reported in the homing signal strength field 27. A range finder 4 receiving the homing signal 27 transmitted at S3 but not a homing signal 26 transmitted at S1 or S2 would report that the user identified by the homing signal is in the range R3. A particular system can incorporate any number of signal strengths and corresponding ranges, to provide the range granularity needed for a particular application.

In an exemplary embodiment, the range finder 4 output device 19 includes a series of colored LEDs. Each LED corresponds to a particular homing signal level that has been received. According to the scenario described above, the user unit 2 rapidly transmits a series of three data packets, each packet corresponding to an output power level and therefore an approximate range. If the range finder 4 receives only the power packet associated with power level S3 and no others during a predetermined time-out period, it will illuminate, for example, a red LED, indicating that the corresponding user is located in the farthest range from the range finder 4. Likewise, if the range finder 4 received all packets including the S1 power packet, a green LED, for example, will be illuminated, indicating that the corresponding user is located in the nearest range from the range finder 4. A yellow LED, for example, can be used for the intermediate range, and additional colors can be used if other intermediate power levels are added. As previously described, alphanumeric displays, auditory alarms, and even vibrational alarms can be included in the output device 19.

Figure 7:
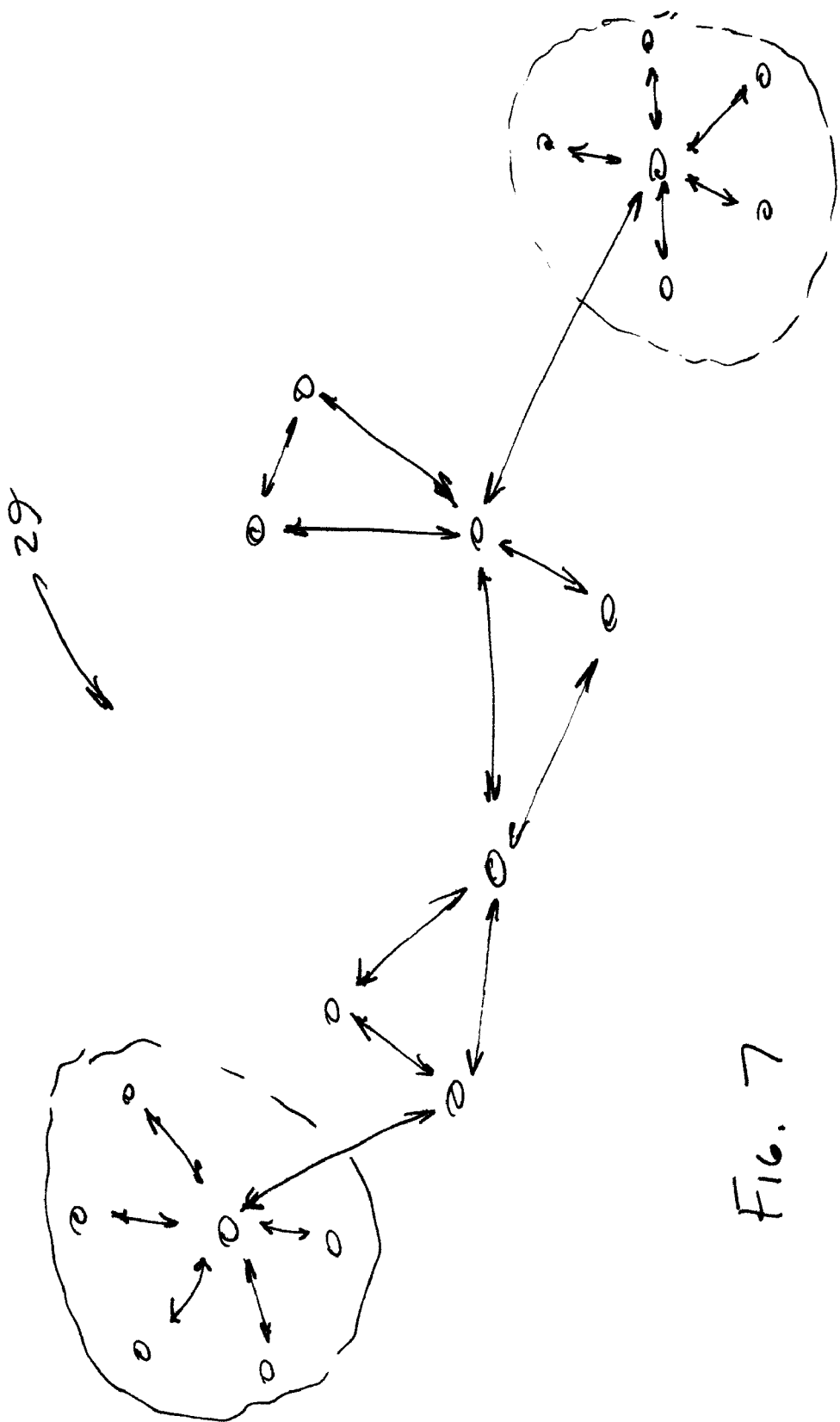
FIG. 7 is an exemplary representation of a mesh network.

When multiple users are using the system, the multiple associated user units 2 can be in communication with each other and with the central unit over a wireless mesh network, shown in general in FIG. 7. The mesh network 29 preferably utilizes a full mesh topology in which each user unit node is connected to each other user unit node and the central unit node, although other topologies, such as a partial net topology, can be used, as well as any combination of star, cluster tree, and mesh topologies. Such a network 29 can handle many-to-many connections, and preferably is capable of dynamically optimizing and updating these connections. Preferably, the central unit node is the network coordinator. A well-known example of a suitable mesh network is the ZigBee network, which only requires low power consumption and therefore provides long battery life, although it is contemplated that other standard and custom mesh networks can be used advantageously as part of the system 1. The central unit 3 can track relative locations of the user units 2 over the mesh network 29 to assist in locating a user who needs assistance.

In summary, the invention is a tracking and locating system that utilizes two different radio frequencies, one to monitor individuals prior to their needing rescue and one to locate individuals when assistance is needed. Each user unit also preferably has at least one sensor such as a man down (lack of motion) sensor which is used to declare an alarm condition. Each user wears a user unit before entering a building or other confined space. The user unit uses a high frequency (for example, 2.4 GHz) signal to communicate with other user units worn by peers. This high frequency signal will use a mesh network such as Zigbee or any other standard or proprietary network. The purpose of the mesh network is to keep track of where each user is relative to each other. For example if ten firefighters enter a building, the user units would constantly monitor to determine if any other firefighters are in range of their radio modules. In the event of an emergency such as a man down, the user unit would use the high frequency to communicate the need for a rescue and a VLF signal would guide the rescuers to the victim even if he or she is buried under debris.

We claim:

1. A tracking and locating system, comprising:
   a user unit;
   a central unit; and
   a range finder;
   wherein the user unit includes a beacon that transmits an information signal, wherein the information signal includes only locally-derived information;
   wherein the central unit receives the information signal directly from the beacon, interprets content of the information signal, and reports the content; and
   wherein the range finder receives the information signal from the beacon, interprets a range field of the information signal to determine a range, and reports the range.

2. The system of claim 1, wherein the range field is a header.

3. The system of claim 1, wherein the beacon is adapted to transmit the information signal constantly.

4. The system of claim 1, wherein the beacon is adapted to transmit the information signal periodically.

5. The system of claim 1, wherein the user unit is adapted to be worn by an individual user.

6. The system of claim 1, wherein the central unit includes a transmitter that transmits an actuation signal, and the user unit includes a receiver that receives the actuation signal from the central unit, whereby the user unit is adapted to be actuated in response to receiving the actuation signal.

7. The system of claim 1, wherein content of the information signal includes information related to the status of the user.

8. The system of claim 7, wherein the information related to the status of the user includes current status information and historic status information.

9. The system of claim 7, wherein the beacon is adapted to transmit the information signal when the status information changes.

10. The system of claim 7, wherein the user unit includes a motion detector, and wherein the content of the information signal indicates a lack of motion of the user when the motion detector detects substantially no motion for a predetermined time period.

11. The system of claim 10, wherein the central unit is adapted to report the lack of motion of the user when the content of the information signal indicates a lack of motion of the user.

12. The system of claim 10, wherein the user unit includes an accelerometer, and wherein the content of the information signal indicates a fall by the user when the accelerometer detects acceleration of the user unit above a predetermined threshold.

13. The system of claim 12, wherein the central unit is adapted to report the fall by the user when the content of the information signal indicates a full by the user.

14. The system of claim 7, wherein the user unit includes a temperature sensor, and wherein the content of the information signal includes an indication of ambient temperature sensed by the temperature sensor.

15. The system of claim 14, wherein the central unit is adapted to report the ambient temperature sensed by the temperature sensor when the ambient temperature sensed by the temperature sensor is above a predetermined threshold.

16. The system of claim 7, wherein the user unit includes an environmental sensor, and wherein the content of the information signal includes an indication of environmental hazard status sensed by the environmental sensor.

17. The system of claim 16, wherein the environmental sensor senses the ambient presence of combustible gas proximate to the environmental sensor.

18. The system of claim 17, wherein the central unit is adapted to report the ambient presence of combustible gas sensed by the environmental sensor when the content of the information signal indicates that the ambient presence of combustible gas sensed by the environmental sensor is above a predetermined threshold.

19. The system of claim 16, wherein the environmental sensor senses the ambient presence of oxygen proximate to the environmental sensor.

20. The system of claim 19, wherein the central unit is adapted to report the ambient presence of oxygen sensed by the environmental sensor when the content of the information signal indicates that the presence of oxygen sensed by the environmental sensor is below a predetermined threshold.

21. The system of claim 7, wherein the information signal includes a field identifying the user.

22. The system of claim 21, wherein the central unit is adapted to report an identification indicator corresponding to the field identifying the user.

23. The system of claim 7, wherein the user unit is adapted to transmit a homing signal.

24. The system of claim 23, wherein the user unit is adapted to transmit the homing signal constantly.

25. The system of claim 23, wherein the user unit is adapted to transmit the homing signal periodically.

26. The system of claim 23, wherein the user unit is adapted to transmit the information signal at a first frequency and the homing signal at a second frequency.

27. The system of claim 26, wherein the first and second frequencies are RF frequencies.

28. The system of claim 26, wherein the first frequency is higher than the second frequency.

29. The system of claim 23, comprising at least two said user units in communication with each other and with the central unit over a mesh network.

30. The system of claim 29, wherein the central unit is adapted to track relative locations of the user units over the mesh network.

31. The system of claim 23, wherein the user unit is adapted to transmit the homing signal at least two different signal strengths.

32. The system of claim 31, wherein the homing signal includes a signal strength field that identities the signal strength.

33. The system of claim 32, wherein the signal strength field is a header.

34. The system of claim 32, wherein the range finder is adapted to read the signal strength field and to report a range associated with the signal strength.

35. The system of claim 7, wherein the central unit is adapted to decode the information signal and to report the status of the user.

36. The system of claim 1, wherein the central unit includes a monitor on which the central unit displays the content of the information signal.

37. The system of claim 1, wherein the central unit includes an audio alarm that sounds when the information signal indicates an alarm condition.

* * * * *